(12) United States Patent
Choda

(10) Patent No.: US 6,190,032 B1
(45) Date of Patent: Feb. 20, 2001

(54) SHAKING MACHINE WITH ROTATION REGULATING COUPLING

(75) Inventor: Yoshihide Choda, Saitama (JP)

(73) Assignee: Eyela-Chino Inc., Musashino (JP)

( * ) Notice: Under 35 U.S.C. 154(b), the term of this patent shall be extended for 0 days.

(21) Appl. No.: 09/446,411

(22) PCT Filed: Apr. 21, 1999

(86) PCT No.: PCT/JP99/02107

§ 371 Date: Dec. 21, 1999

§ 102(e) Date: Dec. 21, 1999

(87) PCT Pub. No.: WO99/54061

PCT Pub. Date: Oct. 28, 1999

(30) Foreign Application Priority Data

Apr. 21, 1998 (JP) .................................................. 10-110705

(51) Int. Cl.[7] .................................................. B01F 11/00
(52) U.S. Cl. .................................................. 366/208
(58) Field of Search ........................... 366/110–112, 114, 366/208–211, 213–216, 219; 464/102–105

(56) References Cited

U.S. PATENT DOCUMENTS

| | | | |
|---|---|---|---|
| 2,192,233 | * | 3/1940 | Mack . |
| 2,255,799 | * | 9/1941 | Meinzer . |
| 3,116,619 | * | 1/1964 | Spielbaur .............................. 464/105 |
| 3,430,926 | * | 3/1969 | Freedman et al. . |
| 3,601,372 | * | 8/1971 | Harmes, III . |
| 4,109,319 | * | 8/1978 | Brandt .................................. 366/219 |
| 4,183,677 | * | 1/1980 | De Bruyne .......................... 366/209 |
| 4,750,845 | * | 6/1988 | Nabetani .............................. 366/208 |
| 5,372,425 | * | 12/1994 | Tannenbaum et al. .............. 366/111 |
| 5,409,312 | * | 4/1995 | Fletcher ............................... 366/208 |
| 5,511,879 | * | 4/1996 | Fletcher ............................... 366/208 |
| 5,558,437 | * | 9/1996 | Rode .................................... 366/208 |
| 5,564,826 | * | 10/1996 | Neumann et al. ................... 366/219 |
| 5,593,228 | * | 1/1997 | Tannenbaum ....................... 366/209 |
| 5,593,609 | * | 1/1997 | Fletcher ............................... 366/208 |
| 5,639,160 | * | 6/1997 | Kishimoto ........................... 366/208 |
| 5,934,804 | * | 8/1999 | Branson et al. ..................... 366/208 |

FOREIGN PATENT DOCUMENTS

| | | | |
|---|---|---|---|
| 48-99954 | | 11/1973 | (JP) . |
| 2-187138 | * | 7/1990 | (JP) .................................... 366/208 |
| 9-308820 | | 12/1997 | (JP) . |
| 10-314568 | | 12/1998 | (JP) . |

* cited by examiner

Primary Examiner—Charles E. Cooley
(74) Attorney, Agent, or Firm—Armstrong, Westerman, Hattori, McLeland & Naughton (57) ABSTRACT

The shaking machine contains a drive shaft (13) having at an upper end thereof an eccentric shaft portion (12) formed with a predetermined off-center value; a frame (16) supporting the drive shaft via a bearing (14); and a shaking table (18) provided on a lower surface thereof with a bearing (17) in which the eccentric shaft portion is fitted and allows the shaking table to make a circular orbital revolving movement with the rotation of the drive shaft. The frame and the shaking table are connected to each other by an integral rotation regulating coupling (19) for regulating the shaking table not to rotate integrally with the drive shaft, and the drive shaft penetrates the integral rotation regulating coupling.

9 Claims, 6 Drawing Sheets

SHAKING MACHINE WITH ROTATION REGULATING COUPLING

TECHNICAL FIELD

The present invention relates to a shaking machine utilized for shaking culture, reaction, dissolution, mixing, etc.

BACKGROUND ART

Among shaking machines, those which have shaking tables to be are shaken in circular orbital movements are each provided with a drive shaft, having at the upper end an eccentric shaft portion formed to have a predetermined off-center value, supported by a pair of bearings disposed to the top and bottom of a frame, with the eccentric shaft portion being fitted in a bearing attached to the lower surface of the shaking table. However, according to this constitution only, although the shaking table is caused to start a circular orbital revolving movement by the rotation of the drive shaft, it begins to autorotate before long to rotate integrally with the drive shaft and ceases shaking.

Accordingly, the above-described shaking machine is provided, at three or more positions around the drive shaft, with driven shafts each having an eccentric shaft portion with the same off-center value as in the counterpart in the drive shaft, and the eccentric shaft portions of the driven shafts are fitted not to the bearing described above but to other bearings attached to the lower surface of the shaking table, respectively, so that the eccentric shaft portions of the driven shafts may rotate in the same phase with respect to the eccentric shaft portion of the drive shaft to regulate autorotation of the shaking table and allow the shaking table to be shaken in a circular orbital revolving movement.

However, since this shaking machine uses one drive shaft and three or more driven shafts, all having eccentric shaft portions with the same off-center value, machining accuracy is strictly required in each shaft. Further, in order to obtain smooth shaking of the shaking table, phase adjustment accuracy is strictly required in the drive shaft and driven shafts in the step of assembling them. Accordingly, assembling and adjustment of the parts take time. Further, insufficient measures have been taken against vibration of the shaking machine itself caused by the eccentric movement of the shaking table.

It is an objective of the present invention to provide a shaking machine which can give smooth shaking of the shaking table using a simple structure and which can reduce the number of parts and the machining and assembling time, leading to reduction of its cost as a product and also vibration of the shaking machine itself.

DISCLOSURE OF THE INVENTION

The shaking machine according to the present invention is provided with a drive shaft having at an upper end thereof an eccentric shaft portion formed with a predetermined off-center value; a frame supporting the drive shaft via bearings; and a shaking table provided on a lower surface thereof with a bearing in which the eccentric shaft portion is fitted; and the shaking table being allowed to make a circular orbital revolving movement by the rotation of the drive shaft. The frame and the shaking table are connected to each other by an integral rotation regulating coupling for regulating the shaking table such that it does not rotate integrally with the drive shaft, and the drive shaft penetrates the integral rotation regulating coupling.

The integral rotation regulating coupling contains a frame bearing support member provided at a top of the frame, a table bearing support member provided on the lower surface of the shaking table and an integral rotation regulating plate interposed between these two bearing support members, and the integral rotation regulating plate has a drive shaft hole and an annular portion containing slots to be engaged with guide pins attached to the frame bearing support member and slots to be engaged with guide pins attached to the table bearing support member. The former slots are formed orthogonal to the latter slots.

Accordingly, the shaking table is regulated during shaking in the circular orbital revolving movement by the integral rotation regulating coupling so as not to autorotate, and thus the shaking table can make a smooth circular orbital movement. Thus, the present invention can abandon the use of three or more driven shafts to achieve simplification of the structure and contribute much to reduction in the number of parts and assembling time, and in turn, to the product cost.

As one embodiment of the present invention, the bearings supporting the drive shaft are disposed at an upper part and a lower part of the frame respectively; the drive shaft is provided at a lower part thereof with a lower eccentric shaft portion formed with the same phase and with the same off-center value as in the upper end eccentric shaft portion; the lower eccentric shaft portion is provided with a disc having a mass corresponding to the gross mass of the shaking table; the upper end eccentric shaft portion is located at a middle position between the center of gravity of the disc and that of the shaking table; and the upper end eccentric shaft portion is provided with a balance mass which offsets a centrifugal force brought about by the eccentric movements of the disc and shaking table.

According to this embodiment, the rotational system including the drive shaft, shaking table, disc and balance mass can be balanced on the vertical and horizontal planes, and vibrations can be reduced. Thus, this embodiment provides improved shaking machines which are frequently operated continuously for a long time in laboratories and the like where they are mainly used.

As an another embodiment, the bearing retaining the drive shaft is disposed at an upper part of the frame; a plurality of supporting legs dangle from the lower surface of the shaking table; lower ends of the supporting legs are extended downward beyond the lower end of the drive shaft; a balance weight with a mass corresponding to the gross mass of the shaking table is attached to lower ends of the supporting legs; the upper end eccentric shaft portion is located at a middle position between the center of gravity of the balance weight and that of the shaking table; and the upper eccentric shaft portion is provided with a balance mass which offsets a centrifugal force brought about by the eccentric movements of the balance weight and shaking table.

According to this constitution, since the balance weight is not rotated by the drive shaft, vibrations can further be reduced. Further, the rotational system including the drive shaft, bearings, pulleys and regulating coupling can be integrated into one unit. In addition, piping, wiring, etc. can be housed in the space below the balance weight, leading to downsizing of the shaking machine.

Furthermore, as the bearing at the top of the frame and the bearing on the lower surface of the shaking table, stacks of at least two single-row bearings are used respectively, and the axis of the drive shaft is prevented from tilting and maintains its perpendicularity.

BEST MODE FOR CARRYING OUT THE INVENTION

The present invention will be described below more specifically based on the embodiments shown in the drawings.

Figure 1:
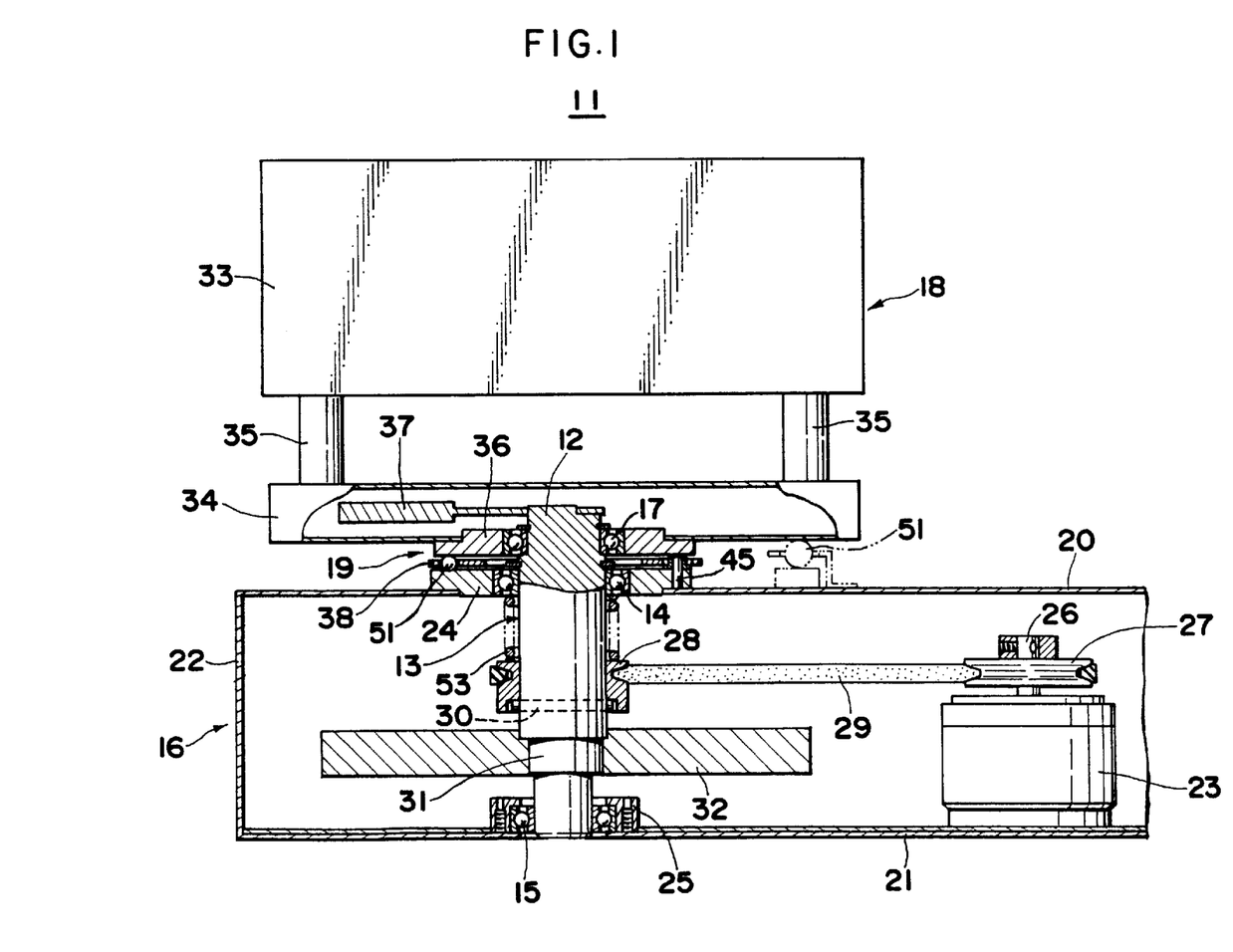
FIG. 1 shows, in partially cross-sectional view, a shaking machine according to a first embodiment of the present invention.
Figure 2:
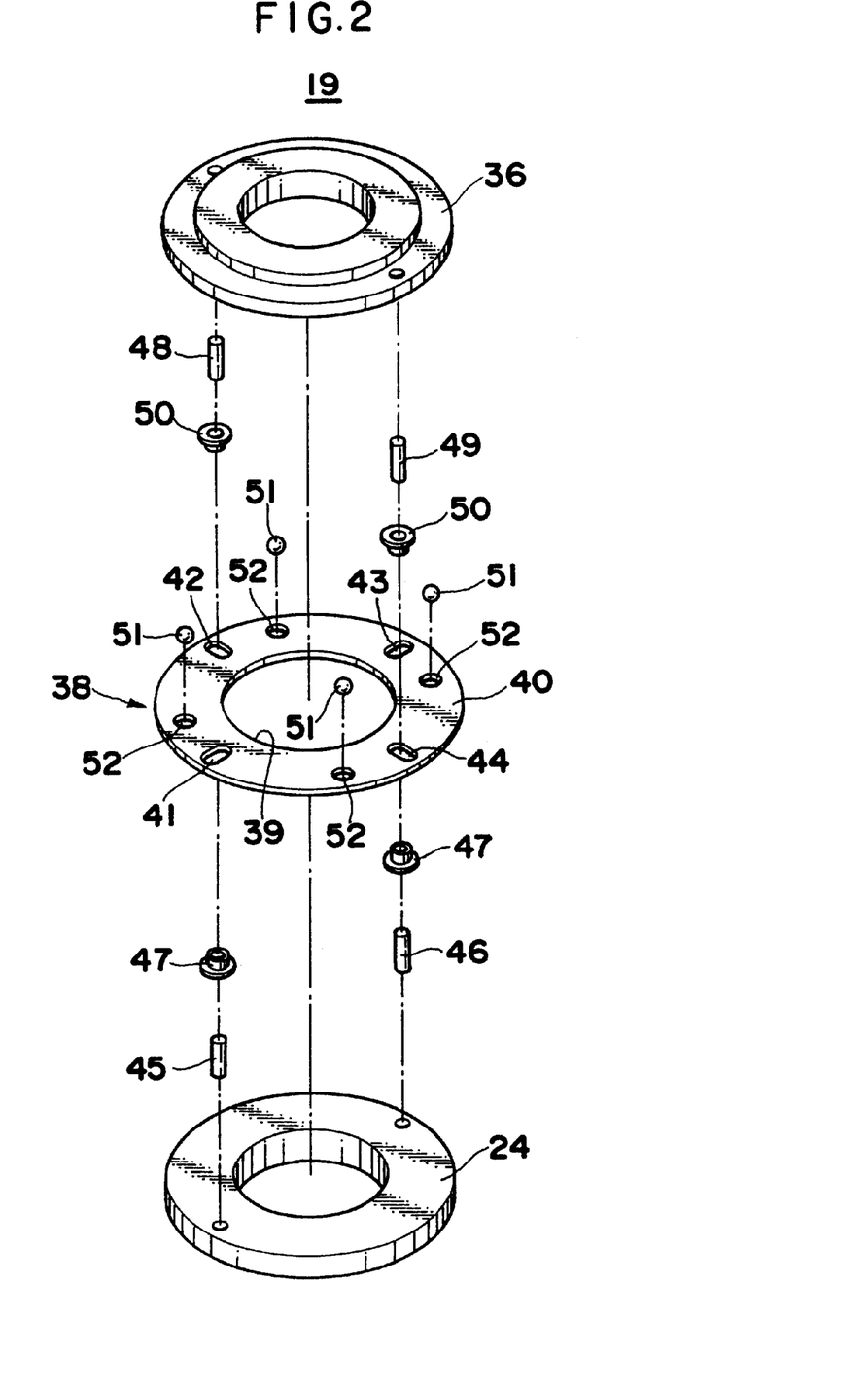
FIG. 2 is an exploded perspective view of the integral rotation regulating coupling according to the first embodiment.

FIGS. 1 and 2 show a shaking machine according to a first embodiment of the present invention. This shaking machine 11 contains a drive shaft 13 having at the upper end an eccentric shaft portion 12 with a predetermined off-center value; a frame 16 for supporting the drive shaft 13 via a pair of bearings 14 and 15; and a shaking table 18 having on the lower surface a bearing 17 in which the eccentric shaft portion 12 is fitted. Both the frame 16 and the shaking table 18 are connected to each other by an integral rotation regulating coupling 19 which regulates the shaking table 18 so as not to rotate integrally with the drive shaft 13. The drive shaft 13 penetrates the integral rotation regulating coupling 19.

The frame 16 consists essentially of a top plate 20, a bottom plate 21 and side plates 22. A motor 23 is disposed in the frame 16. The bearing 14 is attached to the top plate 20 via an upper frame bearing support member 24, whereas the bearing 15 is attached to the bottom plate 21 via a lower frame bearing support member 25. The drive shaft 13, supported by the bearings 14 and 15, can be incorporated rotatably with respect to the frame 16. A belt 29 is wrapped around a pulley 27 of an output shaft 26 in the motor 23 and a pulley 28 of the drive shaft 13. The rotation of the drive shaft 13 causes the shaking table 18 supported by the eccentric shaft portion 12 to make a circular orbital revolving movement. The pulley 28 is designed to be able to rotate integrally with the shaft 13 and also not to shift downward by a pin 30 attached to the middle part of the drive shaft 13.

In the drive shaft 13, a lower eccentric shaft portion 31, which is of the same phase and of the same off-center value as in the upper-end eccentric shaft portion 12, is formed at a position lower than the pin 30. The lower eccentric shaft portion 31 is provided with a disc 32 having a mass corresponding to the gross mass of the shaking table 18.

The shaking table 18 consists essentially of a shaking rack 33, a supporting bed 34 and a plurality of legs 35 for supporting the shaking rack 33 on the supporting bed 34. On the lower surface of the supporting bed 34, the bearing 17 is attached via a table bearing support member 36. The gross mass of the shaking table 18 corresponds to the total mass of the shaking rack 33, supporting bed 34, legs 35, bearing 17 and table bearing support member 36. Further, in this embodiment, the mass of the disc 32, that of the shaking table 18 and their fitting positions are selected such that the central position between the center of gravity of the disc 32 and that of the shaking table 18 may be substantially at the center of the thickness of the supporting bed 34.

The upper end of the eccentric shaft portion 12 fitted in the bearing 17 projects into the supporting bed 34. The eccentric shaft portion 12 has at the upper end a balance mass 37 which offsets a centrifugal force brought about by the eccentric movements of the disc 32 and shaking table 18. Thus, the balance mass 37 is located at the middle position between the center of gravity of the disk 32 and that of the shaking table 18.

The integral rotation regulating coupling 19 contains the upper frame bearing support member 24 of the frame 16, the table bearing support member 36 of the shaking table 18, and an integral rotation regulating plate 38 interposed between these two bearing support members 24 and 36. The integral rotation regulating plate 38 has a drive shaft hole 39 and an annular portion 40 in which four slots 41, 42, 43 and 44 are formed radially at 90° intervals, as shown in FIG. 2. The slots 41 and 43 are oriented in the same direction and are arranged to oppose each other with a phase shift 180°, while the slots 42 and 44 are arranged likewise with a phase shift 90° with respect to the slots 41 and 43.

The slots 41 and 43 are engaged with guide pins 45 and 46, attached to the upper frame bearing support member 24 with a phase shift 180°, via rollers 47 respectively. The slots 42 and 44 are engaged with guide pins 48 and 49, attached to the table bearing support member 36 with a phase shift 180°, via rollers 50 respectively. Accordingly, since each slot permits movement only along its major axis, the slots 41 and 43 permit movement with respect to the frame 16 only in one direction, whereas the slots 42 and 44 permit movement with respect to the shaking table 18 only in the direction orthogonal to the direction in which the frame is allowed to move. Thus, the integral rotation regulating coupling 19 acts like an Oldham's coupling, and the shaking table 18 is regulated so as not to make autorotate with the rotation of the drive shaft 13 but is allowed to be shaken in the circular orbital revolving movement.

Three or more openings 52 are defined at equal intervals in the integral rotation regulating plate 38, and rolling balls 51, which prevent tilting of the table bearing support member 36 caused by the centrifugal force acted upon the shaking table 18, are retained in these openings 52. Incidentally, the rolling balls 51 may be disposed on the frame 16 as shown by the two-dot chain line in FIG. 1 so as to directly support the shaking table 18. Meanwhile, the drive shaft 13 is inserted to inner rings of the bearings 14 and 15 such that the outer circumference of the drive shaft 13 and the inner rings may form minimum clearances respectively. Accordingly, the upper frame bearing support member 24 and the table bearing support member 36 are fitted on the outer circumference of the drive shaft 13 and are retained parallel to each other via the rolling balls 51 with the urging force of a spring 53 interposed in compression between the bearing 14 and the pulley 28, and thus the shaking table 18 maintains parallelism with respect to the upper frame bearing support member 24 during shaking in the circular orbital revolving movement.

In the thus constituted shaking machine 11, the shaking table 18 is regulated, by the action of the integral rotation regulating coupling 19, so as not to autorotate due to the rotation of the drive shaft 13 but shakes in a smooth circular orbital revolving movement based on the off-center value of the eccentric shaft portion 12. Meanwhile, the eccentric rotation of the disc 32 absorbs vibration on the vertical plane among others which are generated during the circular orbital revolving movement of the shaking table 18. Further, the rotation of the balance mass 37 absorbs vibration on the horizontal plane caused by the eccentric rotation of the shaking table 18 and disc 32. Thus, the shaking machine 11 can offset unnecessary vibrations of the drive shaft 13 and shaking table 18 by virtue of the eccentric rotation of these two kinds of weights, i.e. the disk 32 and the balance mass 37, providing an improved shaking machine which is frequently operated continuously for a long time in laboratories and the like where they are mainly used. In spite of the simple structure compared with the prior art shaking machines, comparable shaking can be achieved by one drive shaft 13, contributing much to reduction of the number of parts and assembly time, in turn, to the product cost.

In the first embodiment, while the disc 32 is fixed to the lower eccentric shaft portion 31, the disc 32 may be attached rotatably thereto via a bearing so as to reduce the load to be applied to the motor 23. Further, since the integral rotation regulating coupling 19 may only act like the Oldham's coupling, the slots may be replaced with grooves.

Figure 3:
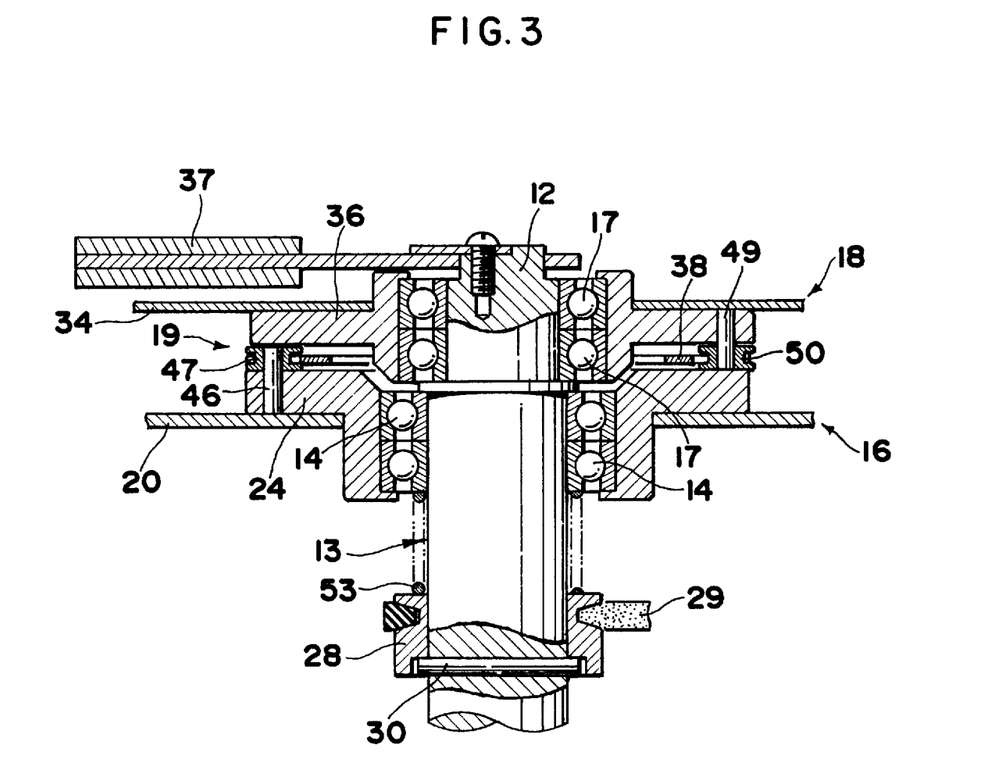
FIG. 3 is a cross-sectional view of the relevant portion showing a variation of the bearing in the first embodiment.

FIG. 3 shows a variation of the relevant portion in the first embodiment. In this shaking machine, the upper bearing 14 of the frame 16 and the bearing 17 of the shaking table 18 each are a stack of two single-row bearings. According to this constitution, the axis of the drive shaft 13 can be prevented by these stacks of two single-row bearings from tilting during shaking, and the parallelism between the frame 16 and the shaking table 18 can be maintained, even if the rolling balls 51 employed in the first embodiment are omitted.

FIGS. 4 to 7 show a second embodiment of the present invention. In this embodiment, the same elements as in the first embodiment are affixed with the same reference numbers respectively, and detailed descriptions of them will be omitted.

Figure 4:
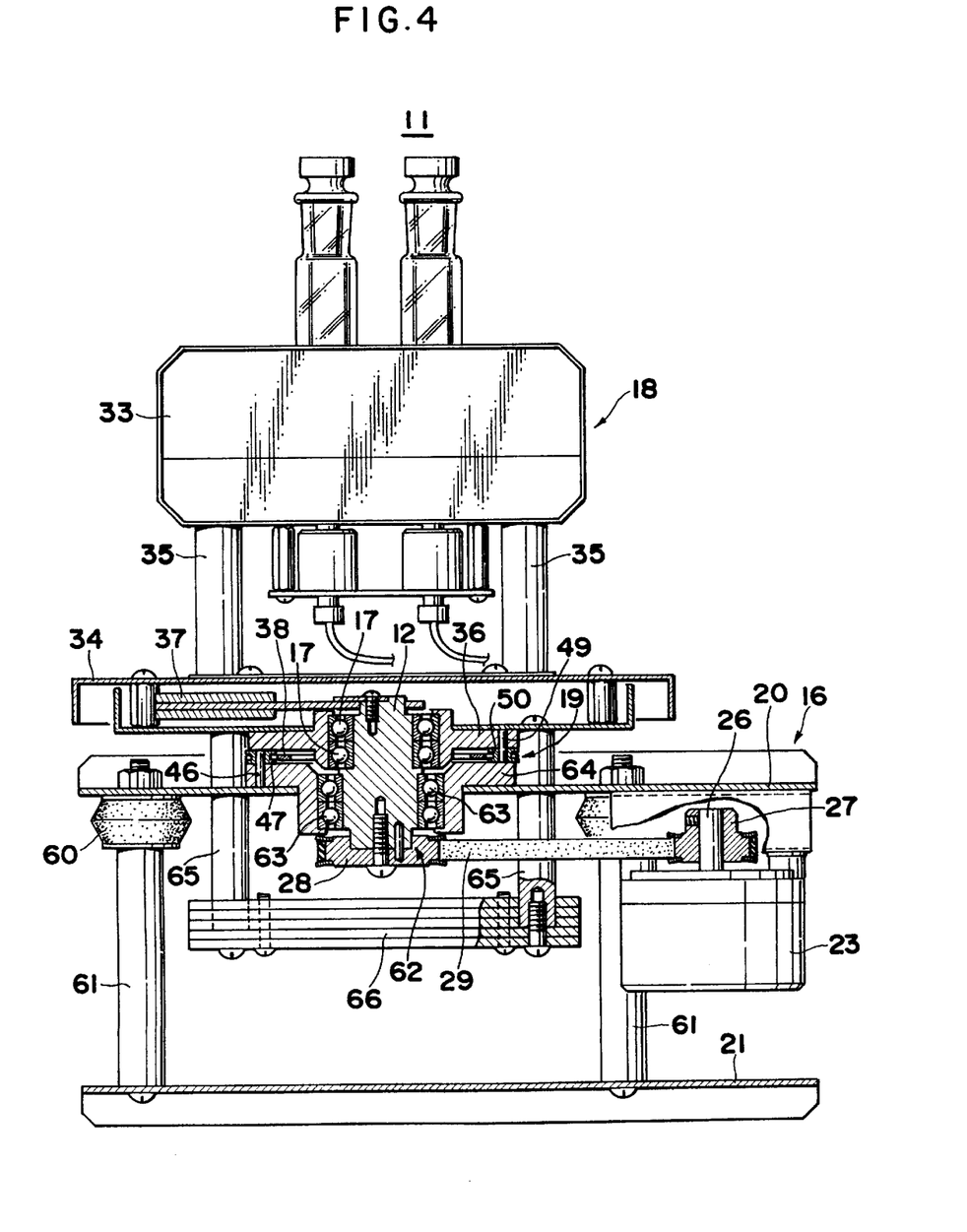
FIG. 4 shows, in partially cross-sectional view, a shaking machine according to a second embodiment of the present invention.
Figure 5:
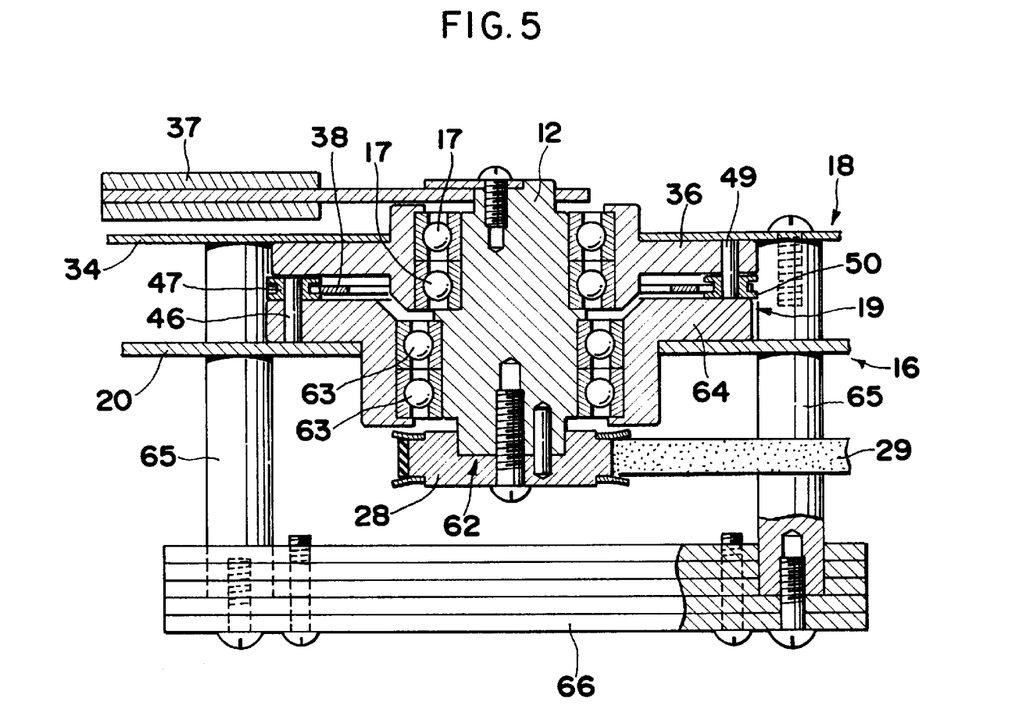
FIG. 5 is an enlarged cross-sectional view of the relevant portion of the second embodiment.
Figure 6:
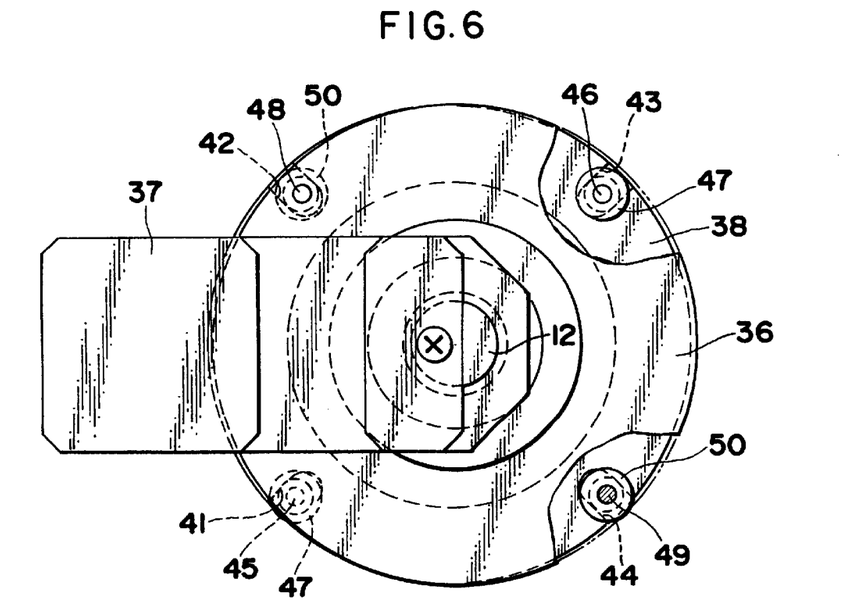
FIG. 6 is a partially cut-away plan view of the relevant portion shown in FIG. 5.
Figure 7:
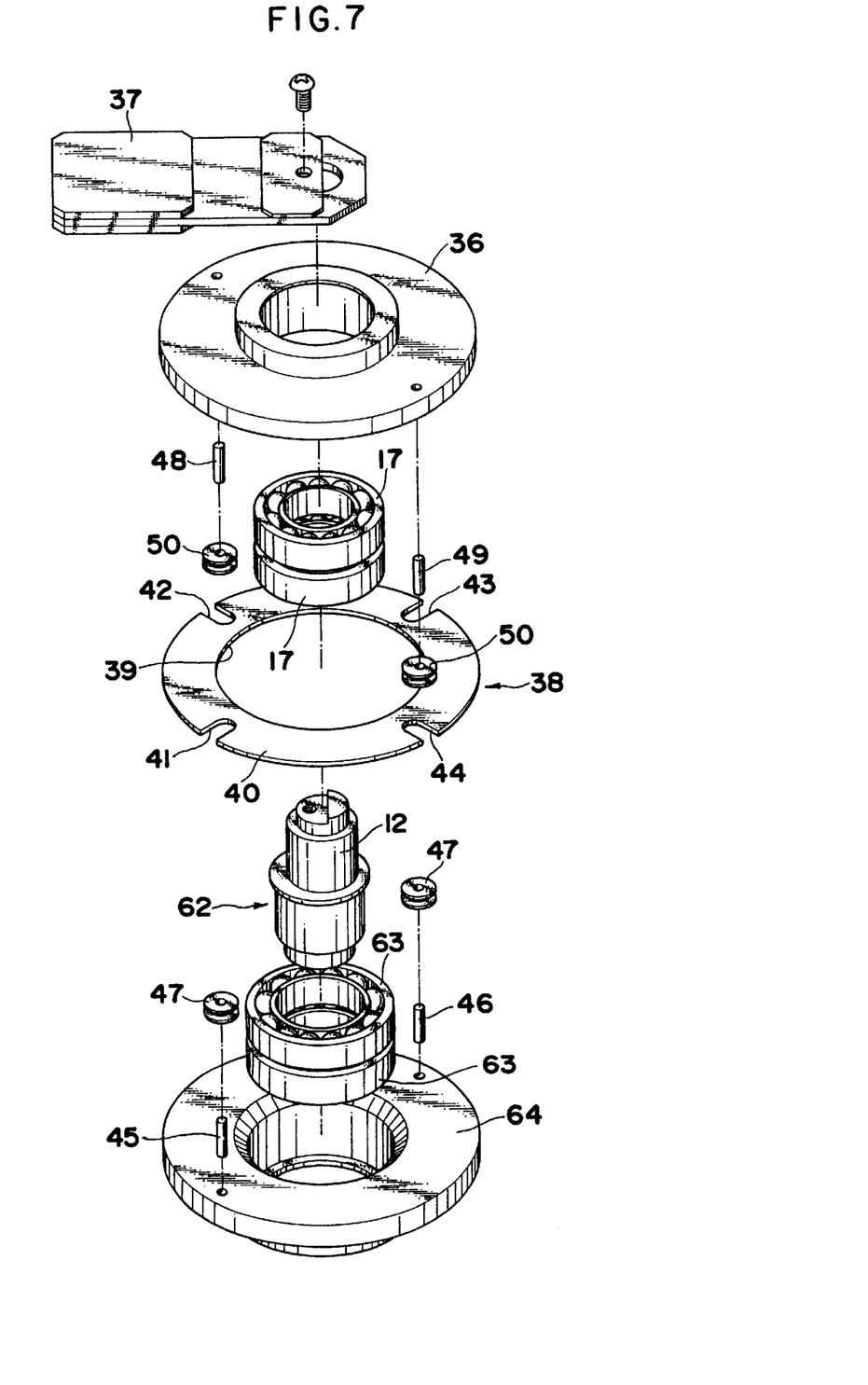
FIG. 7 is an exploded perspective view of the integral rotation regulating coupling according to the second embodiment.

The frame 16 in this shaking machine 11 consists essentially of a top plate 20, a bottom plate 21, and a plurality of posts 61 fixed to the bottom plate 21 and attached to the top plate 20 via cushions 60 respectively. A drive shaft 62 is supported rotatably by a bearing 63 and is born at the upper eccentric shaft portion 12 by a bearing 17 of the shaking table 18. The bearings 63 and 17 each are a stack of two single-row bearings like the upper bearing 14 and bearing 17 in the variation of the first embodiment. This drive shaft 62 is of the length which does not reach the bottom plate 21, and the lower end of the drive shaft 62 protrudes slightly from the lower surface of a frame bearing support member 64 for attaching the bearing 63 to the top plate 20. A belt 29 is wrapped around a pulley 28 fixed to the lower end of the drive shaft 62 and a pulley 27 of a motor 23 attached to the top plate 20.

A plurality of supporting legs 65 dangle from the lower surface of a supporting bed 34 of the shaking table 18 to penetrate the top plate 20. Lower ends of the supporting legs are extended downward beyond the lower end of the drive shaft 62. A balance weight 66 of the mass corresponding to the gross mass of the shaking table 18 is attached to the lower ends of the supporting leg 65. The eccentric shaft portion 12 has, at the upper end that is the central position between the center of gravity of the balance weight 66 and that of the shaking table 18, a balance mass 37 which offsets a centrifugal force to be brought about by the eccentric movements of the balance weight 66 and shaking table 18. Incidentally, through holes defined in the top plate 20, through which the supporting legs protrude, are of such a size that may not interfere with the eccentric movement of the shaking table 18. Slots 41 to 44 are formed in an integral rotation regulating plate 38 to be open to the circumference of its annular portion 40.

In this shaking machine 11, like in the above variation, the axis of the drive shaft 62 can be prevented by these stacks of two single-row bearings from tilting during shaking, so that the rolling balls 51 as used in the first embodiment can be omitted.

In addition, since the balance weight 66 does not rotate, the length of the drive shaft 62 can be minimized. Accordingly, the rotational system including the drive shaft 62, bearings 17 and 63, pulley 28 and integral rotation regulating coupling 19 can be integrated into one unit. Furthermore, piping, wiring, etc. can be housed in the space below the balance weight 66, leading to downsizing of the shaking machine.

What is claimed is:

1. A shaking machine comprising:
    a drive shaft having at an upper end thereof an eccentric shaft portion formed with a predetermined off-center value;
    a frame supporting the drive shaft via bearings; and
    a shaking table having a lower surface; a bearing on the lower surface in which the eccentric shaft portion is fitted; the shaking table being arranged to make a circular orbital revolving movement by the rotation of the drive shaft;
    an integral rotation regulating coupling connecting the frame and the shaking table to each other, and having a function of an Oldham's coupling, such that the shaking table does not rotate integrally with the drive shaft; the drive shaft penetrating the integral rotation regulating coupling.

2. The shaking machine according to claim 1, wherein the integral rotation regulating coupling contains a frame bearing support member provided at a top of the frame, a table bearing support member provided on the lower surface of the shaking table and an integral rotation regulating plate interposed between these two bearing support members, and the integral rotation regulating plate has a drive shaft hole and an annular portion containing slots to be engaged with guide pins attached to the frame bearing support member and slots to be engaged with guide pins attached to the table bearing support member, the former slots being formed orthogonal to the latter slots.

3. The shaking machine according to claim 1, wherein the bearings supporting the drive shaft are disposed at an upper part and a lower part of the frame respectively; the drive shaft is provided at a lower part thereof with a lower eccentric shaft portion formed with the same phase and with the same off-center value as in the upper end eccentric shaft portion; the lower eccentric shaft portion is provided with a disc having a mass corresponding to the gross mass of the shaking table; the upper end eccentric shaft portion is located at a middle position between the center of gravity of the disc and that of the shaking table; the upper end eccentric shaft portion is provided with a balance mass which offsets a centrifugal force to be brought about by the eccentric movements of the disc and shaking table.

4. The shaking machine according to claim 3, wherein the bearing at an upper part of the frame and the bearing on the lower surface of the shaking table each are a stack of at least two single-row bearings.

5. The shaking machine according to claim 1, wherein the bearing retaining the drive shaft is disposed at an upper part of the frame; a plurality of supporting legs dangle from the lower surface of the shaking table; lower ends of the supporting legs are extended downward beyond the lower end of the drive shaft; a balance weight with a mass corresponding to the gross mass of the shaking table is attached to lower ends of the supporting legs; the upper end eccentric shaft portion is located at a middle position between the center of gravity of the balance weight and that of the shaking table; and the upper eccentric shaft portion is provided with a balance mass which offsets a centrifugal force to be brought about by the eccentric movements of the balance weight and shaking table.

6. The shaking machine according to claim 5, wherein the bearing at the top of the frame and the bearing on the lower surface of the shaking table each are a stack of at least two single-row bearings.

7. A shaking machine comprising:
   a drive shaft having at an upper end thereof an eccentric shaft portion formed with a predetermined off-center value;
   a frame supporting the drive shaft via bearings;
   a shaking table having a lower surface; a bearing on the lower surface in which the eccentric shaft portion is fitted; the shaking table arranged to make a circular orbital revolving movement by the rotation of the drive shaft;
   an integral rotation regulating coupling connecting the frame and the shaking table to each other such that the shaking table does not rotate integrally with the drive shaft;
   the drive shaft penetrating the integral rotation regulating coupling;
   the integral rotation regulating coupling having a frame bearing support member, having guide pins, at a top of the frame;
   a table bearing support member, having guide pins, provided on the lower surface of the shaking table;
   an integral rotation regulating plate interposed between these two bearing support member, the integral rotation regulating plate having a drive shaft hole and an annular portion containing slots arranged to engage the guide pins attached to the frame bearing support member and slots arranged to engage the guide pins attached to the table support member, the former slots formed orthogonal to the latter slots.

8. A shaking machine comprising:
   a drive shaft having at an upper end thereof an eccentric shaft portion formed with a predetermined off-center value;
   a frame supporting the drive shaft via bearings;
   a shaking table having a lower surface; a bearing on the lower surface in which the eccentric shaft portion is fitted; the shaking table arranged to make a circular orbital revolving movement by the rotation of the drive shaft;
   an integral rotation regulating coupling connecting the frame and the shaking table to each other such that the shaking table does not rotate integrally with the drive shaft;
   the drive shaft penetrating the integral rotation regulating coupling; wherein the bearings supporting the drive shaft are disposed at an upper part and a lower part of the frame respectively; the drive shaft is provided at a lower part thereof with a lower eccentric shaft portion formed with the same phase and with the same off-center value as in the upper end eccentric shaft portion; a disc is provided on lower eccentric shaft portion having a mass corresponding to the gross mass of the shaking table; the upper end eccentric shaft portion is located at a middle position between the center of gravity of the disc and that of the shaking table; the upper end eccentric shaft portion is provided with a balance mass which offsets a centrifugal force to be brought about by the eccentric movements of the disc and shaking table, and the bearing at an upper part of the frame and the bearing on the lower surface of the shaking table each are a stack of at least two single-row bearings.

9. A shaking machine comprising:
   a drive shaft having at an upper end thereof an eccentric shaft portion formed with a predetermined off-center value;
   a frame supporting the drive shaft via bearings;
   a shaking table having a lower surface; a bearing on the lower surface in which the eccentric shaft portion is fitted; the shaking table arranged to make a circular orbital revolving movement by the rotation of the drive shaft;
   an integral rotation regulating coupling connecting the frame and the shaking table to each other such that the shaking table does not rotate integrally with the drive shaft;
   the drive shaft penetrating the integral rotation regulating coupling; wherein the drive shaft is disposed at an upper part of the frame; a plurality of supporting legs dangle from the lower surface of the shaking table; lower ends of the supporting legs are extended downward beyond the lower end of the drive shaft; a balance weight with a mass corresponding to the gross mass of the shaking table is attached to lower ends of the supporting legs; the upper end eccentric shaft portion is located at a middle position between the center of gravity of the balance weight and that of the shaking table; and the upper eccentric shaft portion is provided with a balance mass which offsets a centrifugal force brought about by the eccentric movements of the balance weight and shaking table, and the bearing at the top of the frame and the bearing on the lower surface of the shaking table each are a stack of at least two single-row bearings.

* * * * *